(12) United States Patent
Roebuck

(10) Patent No.: US 9,980,478 B2
(45) Date of Patent: May 29, 2018

(54) DEVICE AND METHOD FOR VAPORIZING GAME ATTRACTANTS

(71) Applicant: Daniel Corey Roebuck, Biloxi, MS (US)

(72) Inventor: Daniel Corey Roebuck, Biloxi, MS (US)

( * ) Notice: Subject to any disclaimer, the term of this patent is extended or adjusted under 35 U.S.C. 154(b) by 0 days. days.

(21) Appl. No.: 15/425,438

(22) Filed: Feb. 6, 2017

(65) Prior Publication Data

US 2017/0223948 A1    Aug. 10, 2017

Related U.S. Application Data

(60) Provisional application No. 62/292,298, filed on Feb. 16, 2016.

(51) Int. Cl.
*A01M 31/00* (2006.01)
*B05B 17/06* (2006.01)

(52) U.S. Cl.
CPC ....... *A01M 31/008* (2013.01); *B05B 17/0607* (2013.01); *B05B 17/0684* (2013.01)

(58) Field of Classification Search
CPC ..... A01M 13/00; A01M 31/008; B05B 17/06; B05B 17/0607; B05B 17/0676; B05B 17/0684
See application file for complete search history.

(56) References Cited

U.S. PATENT DOCUMENTS

| | | | | |
|---|---|---|---|---|
| 6,857,214 B1* | 2/2005 | Pelissier | ............ | A01M 31/008 43/1 |
| 2003/0020185 A1* | 1/2003 | Cox | .................. | A01M 1/2033 261/26 |
| 2008/0092426 A1* | 4/2008 | Modlin | ............... | A01M 1/2038 43/1 |
| 2009/0065600 A1* | 3/2009 | Tranchant | ............. | A45D 34/02 239/4 |
| 2010/0096409 A1* | 4/2010 | Wainwright | ........ | A01M 1/2038 222/181.2 |
| 2016/0309701 A1* | 10/2016 | DeHaven | ............ | A01M 31/008 |

* cited by examiner

*Primary Examiner* — Darren W Gorman
(74) *Attorney, Agent, or Firm* — AdamsIP, LLC; Gary N. Stewart

(57) ABSTRACT

A device and method for vaporizing game liquid attractants are provided. The vaporizing device has a container suitable for holding vaporizable liquid therein, a wick, a transducer operably connected to a power supply, and a controller. Vaporizable liquid, preferably game attractant or a mixture thereof is drawn to the transducer by the wick. When supplied with electrical current from the power supply, the transducer oscillates at a high frequency sufficient to vaporize the vaporizable liquid drawn to the transducer via cavitation. Once vaporized, game attractant vapor may be diffused or propelled through an outlet in the container to the external hunting environment.

20 Claims, 6 Drawing Sheets

DEVICE AND METHOD FOR VAPORIZING GAME ATTRACTANTS

CROSS REFERENCES

This application claims the benefit of U.S. Provisional Application No. 62/292,298 filed on Feb. 6, 2016 which application is incorporated herein by reference.

FIELD OF THE DISCLOSURE

The subject matter of the present invention refers generally to a device for vaporizing liquid game attractants.

BACKGROUND

Hunters frequently use liquid game attractants to attract various types of game animals to a location within the firing range of the hunter. Such attractants include animal urine as well as manufactured liquids designed to produce odors mirroring a particular animal gland or sweet smelling fruit or vegetable. The effectiveness of these attractants is largely dependent upon the extent to which the odor associated with the attractant can be detected by the olfactory system of the hunted game animal. Thus, the effectiveness of such attractants largely depends on the degree the attractant is diffused throughout the hunting environment. Traditional methods of diffusing liquid game attractant include directly applying the attractant to a structure within the hunting environment, dispersing the attractant as a fine liquid spray via spray devices, and dispersing the attractant as an aerosol through the use of fogging devices. However, dispersing the attractant as a liquid or liquid spray often limits the distance to which the attractant may be diffused by the wind, thereby reducing efficacy of the game attractant. Moreover, dispersing the game attractant as an aerosol often entails releasing chlorofluorocarbons into the atmosphere, thus negatively impacting the environment. Accordingly, such traditional methods are problematic and not ideal for modern hunting applications.

More recently, attempts have been made within the art to cure the problems associated with the traditional methods of diffusing liquid game attractant by vaporizing liquid game attractant to produce a game attractant vapor. Generally, vaporized game attractant can diffuse a greater distance than liquid attractant and is not as detrimental to the environment as conventional aerosols. Devices currently known in the art often vaporize liquid game attractant by elevating the temperature of the game attractant until the attractant reaches a vaporizing point, at which time the attractant is converted to a vapor state. Generally, known devices use a heating element placed in close proximity to the liquid game attractant to achieve this end. However, heating the game attractant in this manner may adversely affect the efficacy of the liquid game attractant by breaking certain chemical bonds or otherwise denaturing certain compounds within the game attractant, such as proteins, associated with the odor naturally emitted by the liquid game attractant. In the event such compounds are denatured, the odor emitted by the game attractant in its vapor state may be wildly different from the odor it is intended to emit in its liquid state, thus reducing or eliminating the efficacy of the game attractant altogether.

Although some non-heating based liquid vaporizing devices have been developed, such devices are generally not designed for, or are incapable of, vaporizing liquid game attractants, such as deer urine. Moreover, such devices are generally intended solely for home or office use and thus are not designed or manufactured to withstand strenuous environmental conditions and wear and tear associated with hunting. For instance, non-heating based vaporizers currently known in the art are likely to break and/or become inoperable if submerged in water or dropped from an elevated structure such as a hunter's tree stand.

Accordingly, there is a need in the art for a non-heating based device and method for vaporizing liquid game attractant that is capable of withstanding the strenuous environmental conditions and wear and tear associated with hunting.

SUMMARY

In one aspect, the present disclosure provides a vaporizing device configured to vaporize a vaporizable liquid into vapor via cavitation. The vaporizing device generally comprises a container, a wick, a transducer configured to oscillate at a frequency sufficient to invoke cavitation, a self-contained power supply, and a controller configured to regulate oscillation of the transducer. The container is preferably divided into two compartments, a vapor chamber and a reservoir. The vapor chamber is the area within the container in which vaporizable liquid—preferably liquid game attractant or a mixture thereof—is converted into vapor. The reservoir serves to hold the vaporizable liquid prior to entry into the vapor chamber. The vapor chamber has an inlet serving as an entryway for vaporizable liquid to pass from the reservoir to the vapor chamber and an outlet serving as an exit through which vapor may exit from the vapor chamber into the external environment.

To facilitate loading of the reservoir, the container preferably comprises a first half and a second half, wherein the first half and second half are removably secured together. The first half defines the vapor chamber and a protective sheath and the second half that defines the reservoir. When removably secured, the protective sheath defined by the first half substantially covers, the second half of the container defining the reservoir, thereby establishing an additional protective layer between the vaporizable liquid within the reservoir and the external environment. In a preferred embodiment, the protective sheath may have thermal insulating material disposed or secured therein to insulate the vaporizable liquid from freezing temperatures.

Vaporizable liquid is drawn from the reservoir to the vapor chamber via a wick. The wick extends from the vapor chamber to the reservoir such that a first end of the wick is disposed within the vapor chamber and a second end of the wick is disposed within the reservoir. The wick is configured to draw vaporizable liquid in contact with the second end of the wick within the reservoir to the first end of the wick within the vapor chamber. The transducer is secured in close proximity to the wick within the vapor chamber such that when the transducer is engaged vaporizable liquid present on the first end of the wick is converted into vapor via cavitation. The transducer may be engaged or disengaged by regulating power flow from the power supply to the transducer.

The vaporizing device of vaporizes vaporizable liquid via cavitation by oscillating the transducer at a frequency sufficient to subject the vaporizable liquid present on the first end of the wick to rapid pressure changes. The rapid pressure changes experienced by the vaporizable liquid result in the rapid formation and collapse of bubbles within vaporizable liquid, which ultimately converts the vaporizable liquid into vapor. Accordingly, the vaporizing device of the present disclosure uses vibration instead of heat to vaporize liquid game attractant, thus eliminating the possibility of overheating and denaturing compounds within the liquid game attractant associated with odor.

A controller is preferably operably connected to the transducer to regulate transducer oscillation. In a preferred embodiment, the controller is operably connected to a receiver configured to receive remote signals from a transmitter, such that the controller regulates oscillation of the transducer based, at least in part, on the signals transmitted by the transmitter. In this way, a user may remotely control the vaporizing device. To ensure the vaporizing device is not rendered inoperable due to water or other environmental conditions, the power supply and controller may be housed within separate waterproof housings secured to the exterior container in some embodiments. In some preferred embodiments, the container, power supply housing, and/or controller housing may be comprised of a shatterproof material to prevent damage to prevent the vaporizing device from being rendered inoperable if dropped or otherwise subjected to forceful impact.

The foregoing summary has outlined some features of the device and methods of the present disclosure so that those skilled in the pertinent art may better understand the detailed description that follows. Additional features that form the subject of the claims will be described hereinafter. Those skilled in the pertinent art should appreciate that they can readily utilize these features for designing or modifying other structures for carrying out the same purposes of the device and methods disclosed herein. Those skilled in the pertinent art should also realize that such equivalent designs or modifications do not depart from the scope of the device and methods of the present disclosure.

DESCRIPTION OF DRAWINGS

These and other features, aspects, and advantages of the present disclosure will become better understood with regard to the following description, appended claims, and accompanying drawings where:

DETAILED DESCRIPTION

In the Summary above and in this Detailed Description, and the claims below, and in the accompanying drawings, reference is made to particular features, including method steps, of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with/or in the context of other particular aspects of the embodiments of the invention, and in the invention generally.

The term "comprises" and grammatical equivalents thereof are used herein to mean that other components, steps, etc. are optionally present. For example, a system "comprising" components A, B, and C can contain only components A, B, and C, or can contain not only components A, B, and C, but also one or more other components.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility). The term "removably secured" and grammatical equivalents thereof are used herein to mean the joining of two components in a manner such that the two components are secured together, but may be detached from one another without requiring the use of specialized tools.

Figure 1:
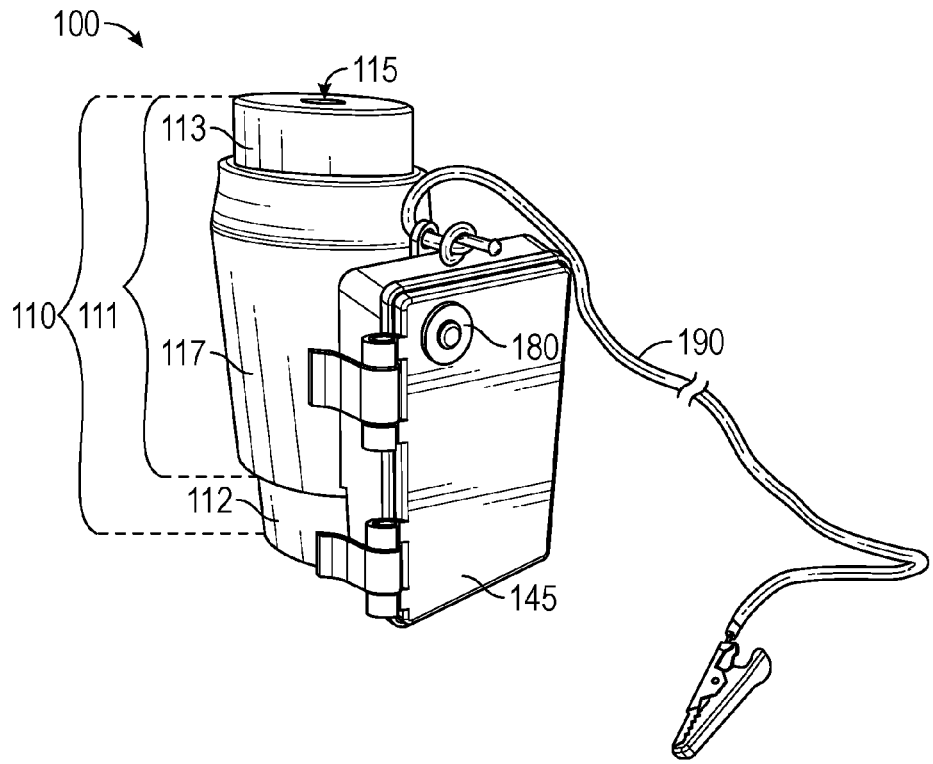
FIG. 1 shows a perspective view of a vaporizing device embodying features consistent with the principles of the present disclosure.
Figure 2:
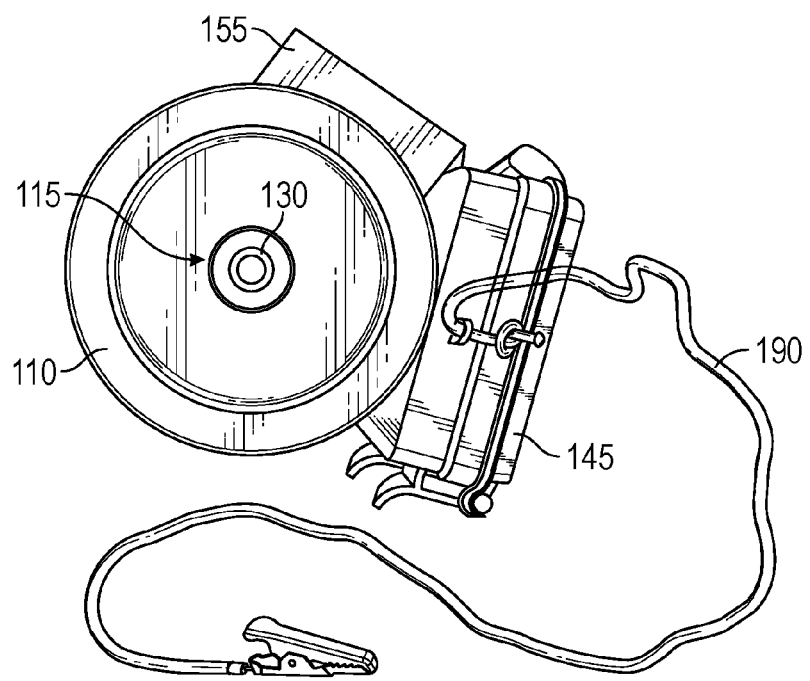
FIG. 2 shows a top view of a vaporizing device embodying features consistent with principles of the present disclosure.
Figure 3:
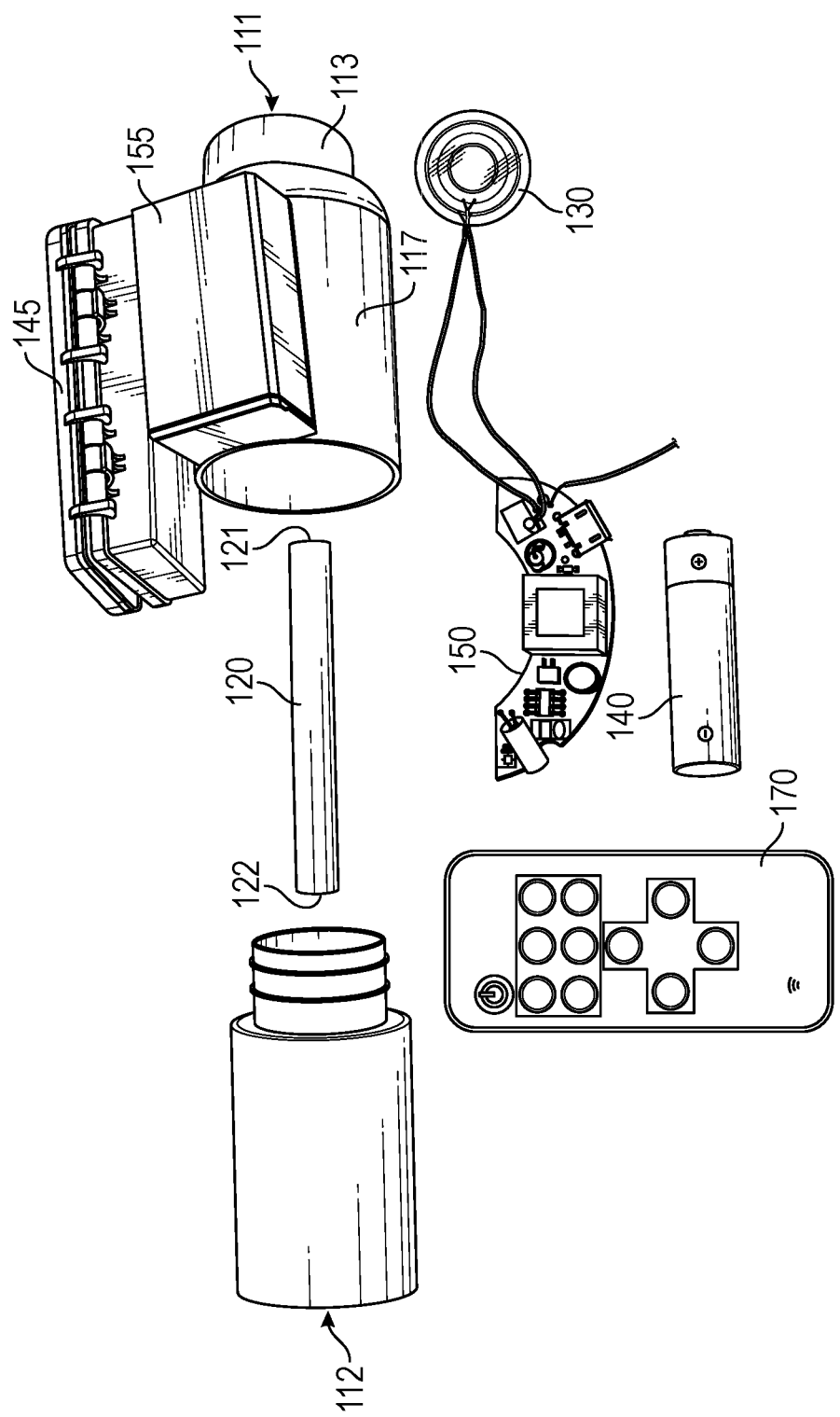
FIG. 3 shows a vaporizing device embodying features consistent with the principles of the present disclosure disassembled and an example transmitter that may be utilized with certain embodiments of the device of the present disclosure.
Figure 6:
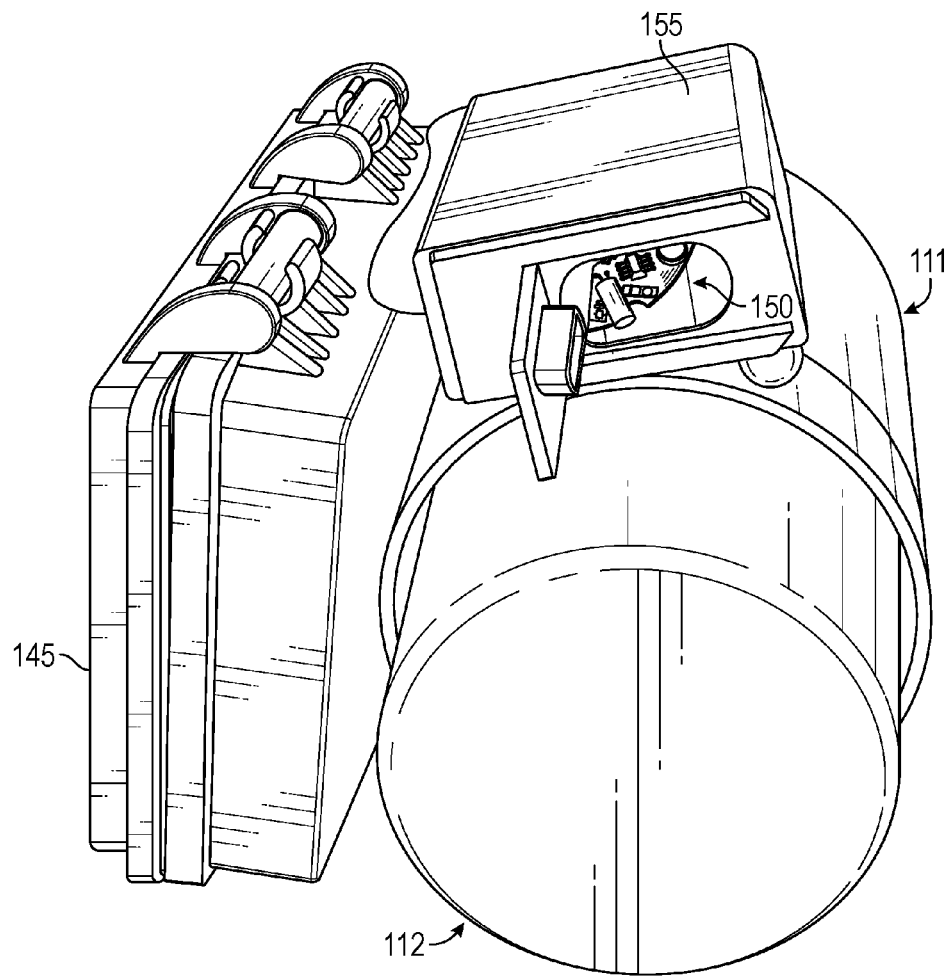
FIG. 6 shows a perspective view of a vaporizing device embodying features consistent with the principles of the present disclosure.
Figure 7:
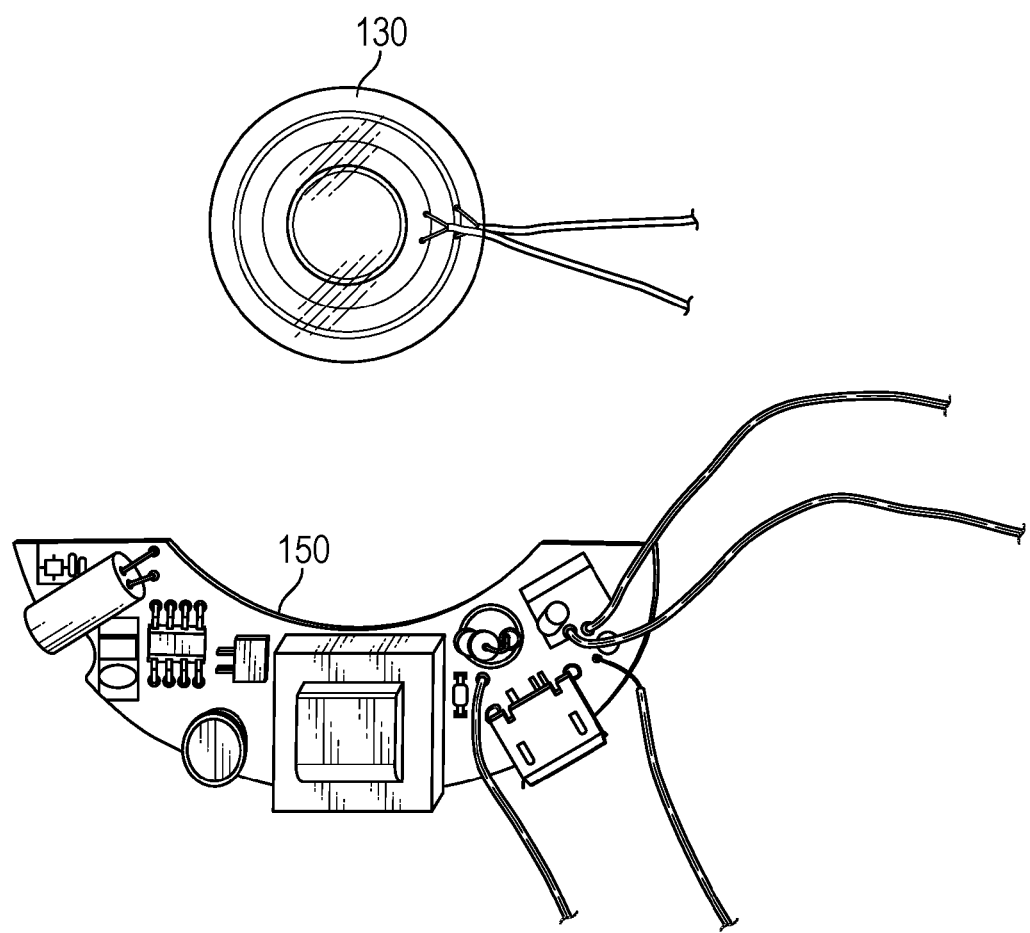
FIG. 7 shows a transducer and a controller embodying features consistent with the principles of the present disclosure.
Figure 8:
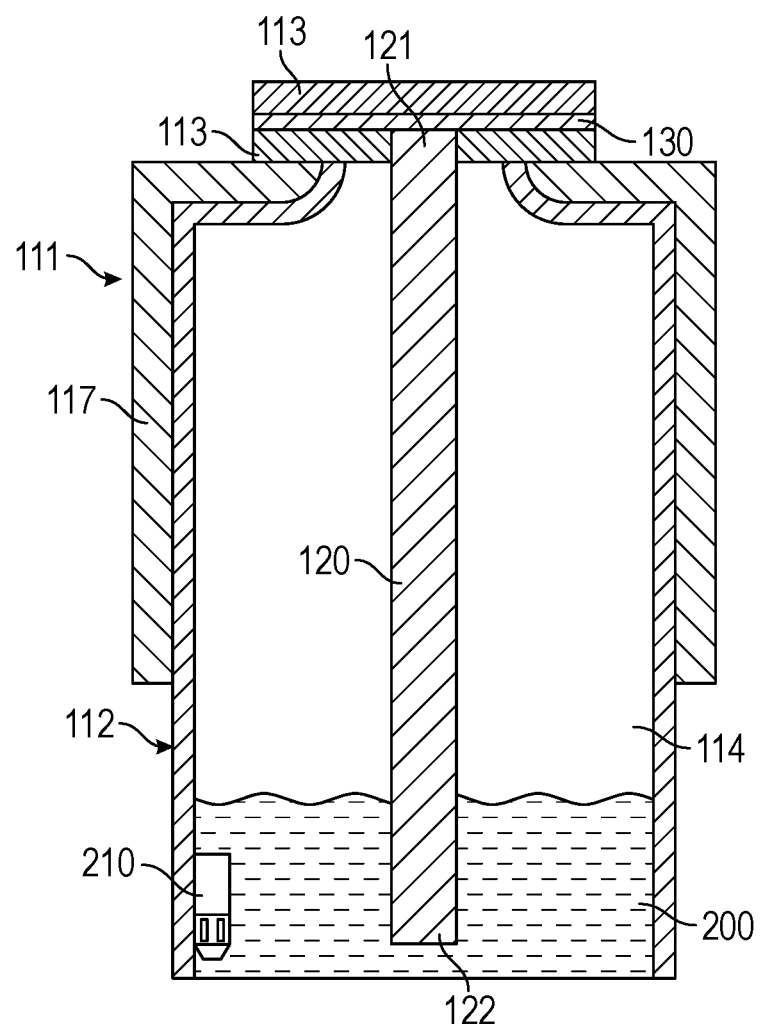
FIG. 8 shows a cross-sectional view of a vaporizing device embodying features consistent with the principles of the present disclosure.

Turning now to the drawings, FIGS. 1-8 illustrate preferred embodiments of a vaporizing device 100 consistent with the principles of the present disclosure. In one aspect a vaporizing device 100 designed to hold and subsequently convert vaporizable liquid 200 into vapor through cavitation is provided. As best shown in FIGS. 1-3, the vaporizing device 100 generally comprises a container 110, a wick 120, a transducer 130, and a power supply 140. The container 110 defines the primary body of the vaporizing device 100 to which other features, elements, or structures disclosed herein may be secured, disposed, or housed. The container 110 is preferably divided into two compartments, a vapor chamber 113 and a reservoir 114, as best shown in FIG. 8. The vapor chamber 113 generally serves as the area within the container 110 in which vaporizable liquid 200 is converted into vapor. The reservoir 114 is the area within container 100 in which vaporizable liquid 200 may be held prior to such vaporization. The vaporizable liquid 200 may be any liquid or mixture of liquid capable of being vaporized through cavitation including, but not limited to, liquid game attractants such as deer urine. Accordingly, the vaporizing device 100 of the present disclosure may find use in a variety of applications associated with odor or scent diffusion. However, for hunting applications, it is preferred that the vaporizable liquid 200 have some volume of liquid game attractant held within the reservoir 114. As used herein, liquid game attractant is understood to mean any composition in a liquid state configured to attract or otherwise engage a game animal's olfactory system. The liquid game attractant may be held within the reservoir 114 in its pure, unmixed form or as a mixture with one or more other liquids. To dilute the intensity of the game attractant vapor produced by the vaporizing device 100, the liquid game attractant may be diluted with water.

Figure 4:
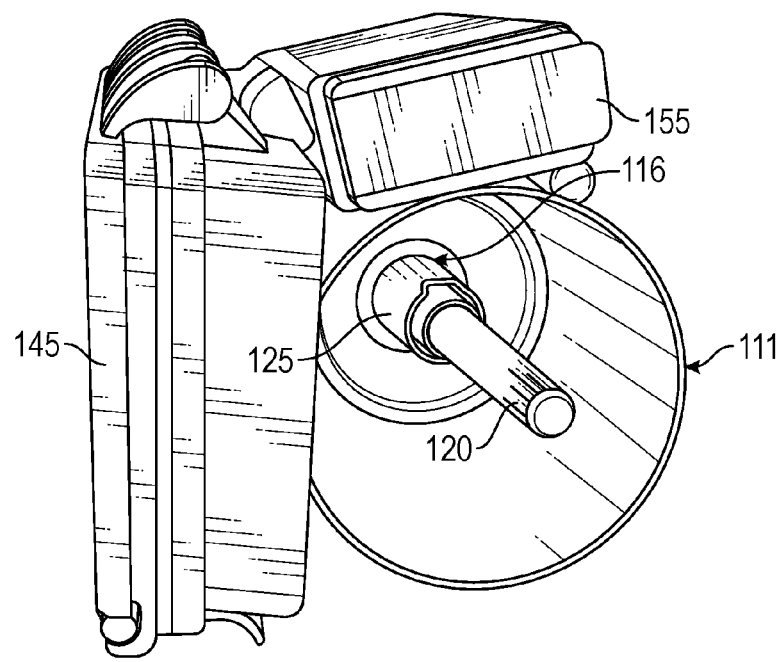
FIG. 4 shows bottom, partial perspective view of a vaporizing device with the reservoir removed embodying features consistent with principles of the present disclosure.

To facilitate entry of the vaporizable liquid 200 from the reservoir 114 to the vapor chamber 113 for vaporization, the vapor chamber 113 has an inlet 116 establishing an opening between the reservoir 114 and the vapor chamber 113. Preferably, the inlet 116 is of sufficient diameter such that a wick 120 may pass therethrough, as best shown in FIGS. 4 and 8. The vapor chamber 113 also has an outlet 115 establishing an opening between the interior of the vapor chamber 113 and an external environment. Game attractant vapor produced from the vaporizing device 100 may naturally diffuse or be propelled through the outlet 115 by the transducer 130 into the external environment. Alternatively, the container 100 may have a single chamber that serves as both the vapor chamber and the reservoir.

To facilitate simple disassembly of the vaporizing device 100, the container 110 preferably comprises a first half 111 and a second half 112 configured to removably secure to one another. In a preferred embodiment, the first half 111 and the second half 112 of the container 110 are removably secured via male thread members disposed on the top of the second half 112 and female thread members disposed near the inlet 116 of the first half 111, or vice versa. Though, one of skill in the art will appreciate that any suitable device or instrument for removably securing two objects together may be used to removably secure the first half 111 to the second half 112 without departing from the inventive subject matter of the present disclosure.

Preferably, the first half 111 of the container 110 defines the vapor chamber 113 and the second half 112 of the container 110 defines the reservoir 114, as best shown in FIG. 8. Although the dimensions of the second half 112 may vary such that the reservoir 114 can hold any suitable, desired volume of vaporizable liquid 200, it is generally preferred that the dimensions of the second half 112 be such that the reservoir 114 can hold at least five and a half ounces of vaporizable liquid 200.

In addition to defining the vapor chamber 113, the first half 111 preferably defines a protective sheath 117 that in addition to the sidewall of the reservoir 114, establishes a protective barrier between the vaporizable liquid 200 and the external environment. The protective sheath 117 defined by the first half 111 substantially covers the second half 112 of the container 110 when the first half 111 and the second half 112 of the container 110 are removably secured, as best shown in FIGS. 1, 6, and 8. In a preferred embodiment, the protective sheath 117 covers at least half of the second half 112. In another preferred embodiment, the protective sheath 117 defined by the first half 111 covers all but the base of the second half 112. In yet another preferred embodiment, a thermal insulating layer of material may be secured to or disposed within the interior of the portion of the first half 111 defining the protective sheath 117 to insulate the vaporizable liquid 200 from freezing temperatures. Preferably, the thermal insulating layer of material is positioned between the first half 111 and the second half 112 when the first half 111 and second half 112 are removably secured together.

Preferably, the first half 111 and the second half 112 of the container 110 are comprised of a rigid plastic material to establish a lightweight but durable body. However, one of skill in the art will appreciate that the first half 111 and second half 112 of the container 110 may be made of any suitable material including, but not limited to, wood, metal, or glass. In some instances, the material comprising the first half 111 may be different from the material defining the second half 112. To prevent breakage of the container 110 when dropped or otherwise subject to forceful impact, either the first half 111, the second half 112, or both halves of the container 110 may be comprised, at least partially, of a shatterproof material such as polycarbonate or other similar thermoplastics.

The vaporizing device 100 utilizes a wick 120 to transport vaporizable liquid 200 from the reservoir 114 to the vapor chamber 113 for vaporization. As best shown in FIG. 8, the wick 120 is preferably disposed within the container 110 such that a first end 121 of the wick 120 is disposed within the vapor chamber 113 and a second end 122 of the wick 120 is disposed within the reservoir 114. Alternatively, the first end 121 of the wick 120 may not be disposed within the vapor chamber 113, depending on the orientation of the transducer 130 within the vapor chamber. For instance, if the transducer 130 is oriented on the floor of the vapor chamber 113 such that transducer 130 rests or is secured directly over the inlet 116, the wick 120 may extend through the inlet 116 to the extent that the first end 121 of the wick 120 contacts the transducer 130 but does not break the plane into the vapor chamber 113.

In a preferred embodiment, the wick 120 is removably secured to the inlet 116 of the vapor chamber 113. In another preferred embodiment, the vaporizing device 100 may further comprise a wick support 125 configured to secure the wick 120 thereto. As shown in FIG. 4, the wick support 125 is preferably secured to the container 110 such that the wick support 125 is disposed over the inlet 116 and extends downwardly towards the reservoir 114. As further illustrated in FIG. 4, the wick support 125 preferably has a bore extending therethrough of sufficient diameter such that the wick 120 may slidably pass therethrough.

The wick 120 draws vaporizable liquid 200 in contact with the second end 122 of the wick 120 to the first end 121 of the wick 120. It is understood that in embodiments wherein the container 100 is divided into a vapor chamber 113 and a reservoir 114, that any portion of the wick 120 disposed within the reservoir 114 of the container 110 is considered to be the second end 122 of the wick 120. Preferably, the wick 120 is comprised of a material such that vaporizable liquid 200 in contact with the second end 122 of the wick 120 can be drawn to the first end 121 of the wick 120 via capillary action. Although, the present disclosure also contemplates alternative embodiments wherein vaporizable liquid 200 is transported by or through the wick via suction generated by the transducer 130 or otherwise. Once vaporizable liquid 200 is present on the first end 121 of the wick 120, the transducer 130 may be engaged to vaporize such vaporizable liquid 200.

When engaged, the transducer 130 is configured to oscillate at a frequency sufficient to vaporize vaporizable liquid 200 present on the first end 121 of the wick 120 via cavitation. In a preferred embodiment, the transducer 130 is an ultrasonic transducer configured to oscillate at an ultrasonic frequency. Preferably, the transducer 130 is a piezoelectric transducer comprising a ceramic disc positioned between two electrodes, as best shown in FIG. 7. Although, one of skill in the art will appreciate that any transducer and oscillation frequency suitable for subjecting vaporizable liquid 200 to rapid pressure changes which cause the vaporizable liquid to 200 to vaporize due to the rapid formation and collapse of bubbles within the liquid, i.e., cavitation, may be used without departing from the inventive subject matter of the present disclosure.

In a preferred embodiment, the transducer 130 is housed within the container 110 within the vapor chamber 113 such that the transducer 130 is disposed between the inlet 116 and outlet 115 and is in close proximity to the first end 121 of the wick 120. As used herein, close proximity to the first end 121 of the wick 120 is understood to mean that the transducer 130 and first end 121 of the wick 120 are positioned close enough to one another such that when the transducer 130 oscillates at a sufficient frequency to induce cavitation of the vaporizable liquid 200 present on the first end 121 of the wick 120, the vaporizable liquid 200 present on the first end 121 of the wick 120 vaporizes. In a preferred embodiment, the transducer 130 and the first end 121 of the wick 120 physically contact one another, as shown in FIG. 8.

To engage the transducer 130, electric current ("power") generated by the power supply 140 is transferred to the transducer 130. The power supply 140 is operably connected in a manner to facilitate such power transmission. In one preferred embodiment, the transducer 130 is directly wired to the power supply 140. In other embodiments, the transducer 130 may be operably connected to the power supply 140 via other structural components disclosed herein. For instance, the controller 150 and/or receiver 160 disclosed below may serve as intermediate structures operably connecting the power supply 140 to the transducer 130. The vaporizing device 100 may further comprise a power switch 180 configured to control the delivery of power from the power supply 140 to the transducer 130, thereby enabling a user to engage or disengage the transducer 130 by hand. To avoid circuitry problems within the vaporizing device 100 caused by exposure to adverse weather such as rain or snow, it is preferred that the power switch 180 is waterproof. In a preferred embodiment, the power switch 180 is secured to the power supply housing 145 disclosed below. To enable mobile use of the vaporizing device 100, the power supply 140 is self-contained within the vaporizing device 100. To this end, in a preferred embodiment, the power supply 140 is one or more batteries, as shown in FIG. 3, although it is understood that any suitable power supply enabling portable use of the vaporizing device 100 may be used. To reduce environmental impact and maintenance cost, it is preferred that the power supply is rechargeable.

Figure 5:
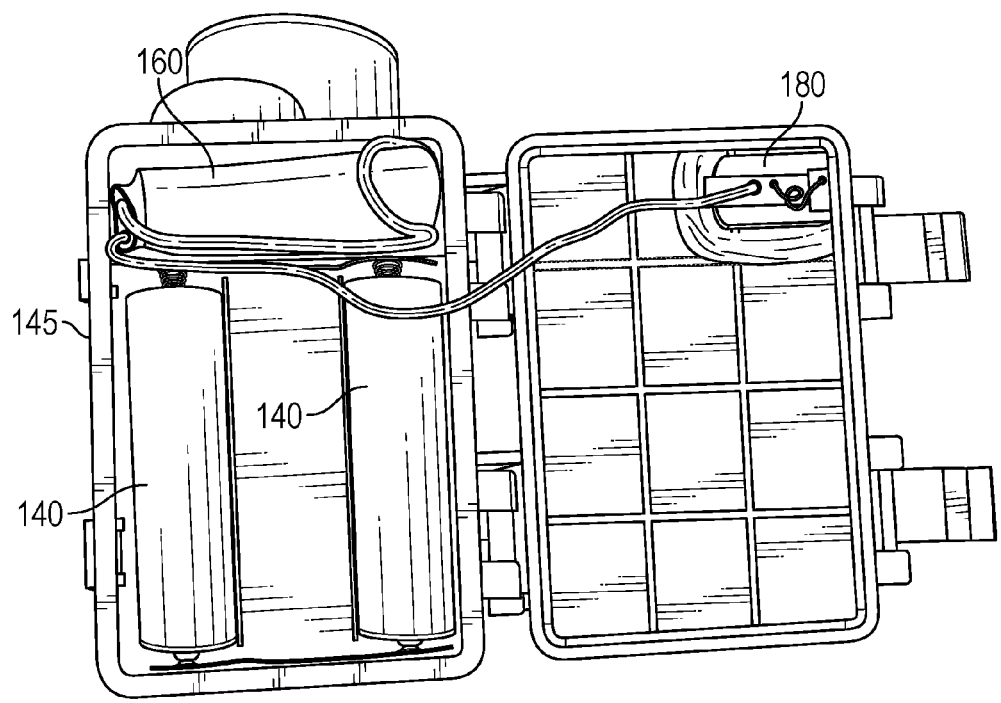
FIG. 5 shows a side view of a vaporizing device embodying features consistent with the principles of the present disclosure.

As shown in FIGS. 1-6, the power supply 140 is preferably housed within a power supply housing 145 secured to the exterior of the container 110. As best shown in FIG. 3, the power supply housing 145 may be secured to the exterior of the first half 111 of the container 110 such that second half 112 defining the reservoir 114 may be removed from the first half 111 without also removing the power supply housing 145. In addition to the power supply 140, the power supply housing 145 may be configured to house additional structures, elements, or features of the present disclosure therein. For instance, as shown in FIG. 5, the power supply housing 145 may also house the receiver 160 disclosed herein. To prevent water or other elemental damage, the power supply housing 145 is preferably designed to establish a waterproof barrier between the power supply 145 and the external environment. To this end, in one preferred embodiment, as best shown in FIG. 5, the power supply housing 145 may comprise of a receptacle hingedly connected to a door wherein the door may be opened or closed via one or more fastening members. In such embodiments, the power supply housing 145 may further comprise a gasket disposed between the receptacle and door to ensure a waterproof seal is established between the receptacle and the door. The power supply housing 145 is preferably comprised of a rigid plastic. Although, one of skill in the art will appreciate that the power housing 145 may be comprised of any suitable material including, but not limited to metal, wood, or glass. To prevent breakage of the container power supply housing 145 when subjected to conventional forces experienced when dropped, slammed, or thrown, the power supply housing 145 is preferably comprised of a shatterproof material, such as polycarbonate or other similar thermoplastics.

In order to regulate oscillation of the transducer 130 and execute certain remote and/or automated actions disclosed herein, the vaporizing device 100 further comprises a controller 150, as shown in FIG. 3. The controller 150 is operably connected to the transducer 130 and is configured to regulate the oscillation thereof. In a preferred embodiment, the controller 150 regulates the oscillation of the transducer 130 by regulating the flow of power from the power supply 140 to the transducer 130. Thus, in some embodiments, the controller 150 may increase or decrease the frequency of oscillation by increasing or decreasing the power transmitted from the power supply 140 to the transducer 130, respectively. Moreover, in such embodiments, the controller 150 may stop or block the flow of power from the power supply 140 to the transducer 130 to completely cease oscillation of the transducer 130 altogether. In this way, the controller 150 may serve to engage and disengage the transducer 130.

In a preferred embodiment, the controller 150 may be preprogrammed such that the controller 150 regulates oscillation of the transducer 130 in a predefined manner upon user receipt. For instance, the controller 150 may be preprogrammed to cause the transducer 130 to oscillate in predefined time intervals or at predefined oscillation frequencies. Alternatively, the controller 150 may be programmable such that a user may program the manner in which the user desires the controller 150 to regulate oscillation of the transducer 130.

As shown in FIGS. 2-4 and 6, the vaporizing device 100 may further comprise a controller housing 155 which houses the controller 150 therein secured to the container 110. As best shown in FIG. 3, the controller housing 155 is preferably secured to the exterior of the first half 111 of the container 112 such that second half 112 defining the reservoir 114 may be removed from the first half 111 without also removing the controller housing 155. In addition to the controller 150, the controller housing 155 may be configured to house additional structures, elements, or features of the present disclosure therein. As best shown in FIG. 6, the controller housing 155 preferably has an access panel, which may be opened or removed from the body of the controller housing 155 to provide easy access to the controller 150. To prevent water or other elemental damage to the controller 150, the controller housing 155 is preferably designed to establish a waterproof barrier between the controller 150 and the external environment. The controller housing 155 is preferably comprised of a rigid plastic. Although, one of skill in the art will appreciate that the power housing 155 may be comprised of any suitable material including, but not limited to metal, wood, or glass. To prevent breakage of the controller housing 155 when dropped or otherwise subjected to forceful impact, the controller housing 145 is preferably comprised of a shatterproof material, such as polycarbonate or other similar thermoplastics.

The manner in which the controller 150 regulates oscillation of the transducer 130 may be based, at least in part, by the input received from other components within the vaporizing device 100. As shown in FIG. 5, the vaporizing device 100 may further comprise a receiver 160. The receiver 160 may be a separate component of the vaporizing device 100 operably connected to the controller 150 or may be a subcomponent of the controller 150. The receiver 160 is configured to receive remote signals transmitted from a transmitter 170. Signals received by the receiver 160 are subsequently transmitted to the controller 150, which then regulates the oscillation of the transducer 130 based, at least in part, on signals received and transmitted by the receiver 160. For instance, a user may use a transmitter 170 to transmit a power signal to the receiver 160 to engage or disengage the transducer 130, thereby enabling a user to remotely turn the vaporizing device 100 on or off. Accordingly, by communicating instruction signals from the transmitter 170 to the receiver 160 in this way, a user can remotely control the operation of the vaporizing device 100. In addition to powering on and off the vaporizing device 100, the transmitter 170 may be configured to transmit and the controller 150 may be configured to regulate oscillation of the transducer 130 based on signals indicative of various operations including, but not limited to, increasing or decreasing the oscillation frequency of the transducer 130 or engaging and disengaging the transducer 130 at defined time intervals.

In a preferred embodiment, the receiver 160 is a radio frequency receiver configured to receive radio frequency signals and the transmitter 170 is a radio frequency remote configured to transmit radio frequency signals. However, one of skill in the art will appreciate that any suitable receiver may be used including, but not limited to, infrared or Bluetooth receivers. Moreover, one of skill in the art will appreciate any suitable transmitter may be used including, but not limited to infrared transmitters or Bluetooth transmitters. In some embodiments, the power switch 180 may be operably connected to the controller 150 to manually transmit a power signal to the controller 150. As shown, in FIG. 5, the receiver 160 may serve as an intermediate structure operably connecting the power switch 180 to the controller 150.

In another preferred embodiment, the vaporizing device 100 may further comprise a level sensor 210 to facilitate automated disengagement of the transducer 130 based on volume or level of liquid within the reservoir 114. In such embodiments, the level sensor 210 is secured to an interior wall of the reservoir 114, as shown in FIG. 8, and is operably connected to the controller 150. The level sensor 210 is configured to detect the level of liquid within the reservoir 114 and the controller 150 is configured to stop the flow of power form the power supply 140 to the transducer 130, thereby disengaging the transducer 130, upon the level sensor 200 detecting the that the liquid within the reservoir 114 has fallen below a defined threshold. The defined threshold of liquid level or volume may be pre-programmed within the controller 150 upon user receipt or a may be programmable into the controller 150 by a user after user receipt. Preferably, the defined threshold is a liquid level indicative of a volume wherein the vaporizable liquid 200 does not contact the second end 122 of the wick 120 when the vaporizing device 100 is positioned upright on a flat surface.

The vaporizing device 100 may further comprise a fastening device 190. The fastening device 190 is preferably secured to the exterior of the container 110, as shown in FIGS. 1-2. Alternatively, the fastening device 190 may be secured elsewhere on the vaporizing device 100 such as the power supply housing 145 or controller housing 155. The fastening device 190 may serve to secure the vaporizing device 100 to elevated structures including, but not limited to, trees, tree stands, or fences. Preferably, the fastening device 190 is configured to secure the container 110 in an upright position such that the inlet 115 faces skywardly. As shown in FIGS. 1-2, in a preferred embodiment the fastening device 190 is a string having a first end secured to the container 110 and a second end having a clamp member secured thereto. One of skill in the art will, appreciate that any fastening device suitable for removably securing the container 110 to a structure may be used as fastening device 190.

In another aspect, the present disclosure is directed to a method for vaporizing liquid game attractant. More specifically, a method for vaporizing liquid game attractant via cavitation is provided. The methodology of the present disclosure requires first providing a vaporizing device 100 having some or all of the structural features consistent with the embodiments detailed above. Preferably, the vaporizing device 100 at least comprises the following structural components: a container 110, a wick 120, a transducer 130, a self-contained power supply 140, and a controller 150 configured to regulate oscillation of the transducer 130. Once the vaporizing device 100 is provided, liquid game attractant is loaded into the reservoir 114 such that the second end 122 of the wick 120 is at least partially submerged by the liquid game attractant, thereby enabling liquid game attractant to be drawn from the second end 122 of the wick 120 to the first end 121 of the wick 120 via capillary action or otherwise. Depending on the nature of the container 110 used, the step of loading game attractant into the reservoir 114 may comprise unsecuring the first half 111 from the second half 112 of the container 110, loading liquid game attractant into the reservoir 114, and then removably securing the first half 111 and the second half 112 back together. Once liquid game attractant is disposed on the first end 121 of the wick 120, the transducer 130 is engaged to begin oscillating at frequency sufficient to vaporize the liquid game attractant present on the first end 121 of the wick 120 via cavitation. The vapor produced from the cavitation of the liquid game attraction may then naturally diffuse or be propelled by the transducer 130 through the outlet 115 into the external environment.

In one preferred methodology the vaporizing device 100 provided has a controller 150 operably connected to the transducer 130 and a receiver 160 configured to receive signals transmitted from a transmitter 170 operably connected to the controller 150. In such preferred methodologies, the step of engaging the transducer 130 may comprise transmitting a power signal from the transmitter 170 to the receiver 160 to engage or disengage the transducer 130 depending on the nature of the power signal transmitted. In embodiments, wherein the vaporizing device 100 has a controller 150 operably connected to the transducer 130, the methodology contemplated by the present disclosure may further comprise the step of varying the oscillation frequency of the transducer 130 via the controller 150.

It is understood that versions of the invention may come in different forms and embodiments. Additionally, it is understood that one of skill in the art would appreciate these various forms and embodiments as falling within the scope of the invention as disclosed herein.

What is claimed is:

1. A vaporizing device comprising:
   a container comprising:
      a first half defining a vapor chamber and a protective sheath,
         wherein the vapor chamber has an inlet and an outlet,
      a second half defining a reservoir for holding a vaporizable liquid therein,
         wherein the first half and the second half are removably secured together
         and the protective sheath substantially covers the second half;
   a wick disposed within the container such that a first end of the wick is disposed within the vapor chamber and a second end of the wick is disposed within the reservoir, wherein the wick is configured to draw vaporizable liquid in contact with the second end of the wick to the first end of the wick;

a transducer configured to oscillate at a frequency sufficient to vaporize, via cavitation, the vaporizable liquid drawn to the first end of the wick, wherein the transducer is disposed between the inlet and the outlet of the vapor chamber;

a self-contained power supply operably connected to the transducer; and a controller operably connected to the transducer, wherein the controller is configured to regulate oscillation of the transducer.

2. The device of claim 1, further comprising a receiver operably connected to the controller, wherein the receiver is configured to receive remote signals transmitted from a transmitter, and wherein the controller is configured to regulate oscillation of the transducer based on the signals transmitted from the transmitter.

3. The device of claim 1, further comprising a waterproof power switch, wherein the power switch is configured to control the delivery of power from the self-contained power supply to the transducer.

4. The device of claim 1, further comprising a power supply housing configured to house the self-contained power supply therein, wherein the power supply housing is secured to the container.

5. The device of claim 4, wherein the power supply housing is waterproof.

6. The device of claim 1, further comprising a controller housing configured to house the controller therein, wherein the controller housing is secured to the container.

7. The device of claim 6, wherein the controller housing is waterproof.

8. The device of claim 1, further comprising a level sensor operably connected to the controller, wherein the level sensor is configured to detect the level of liquid within the reservoir, and wherein the controller is configured to stop the flow of power from the self-contained power supply to the transducer upon the level sensor detecting the liquid level within the reservoir is below a defined threshold.

9. The device of claim 1, further comprising a fastening device configured to secure the container in an upright position.

10. A vaporizing device comprising:

a container comprising:

a first half defining a vapor chamber and a protective sheath, wherein the vapor chamber has an inlet and an outlet, a second half defining a reservoir for holding a vaporizable liquid therein, wherein the first half and the second half are removably secured together and the protective sheath substantially covers the second half;

a wick disposed within the container such that a first end of the wick is disposed within the vapor chamber and a second end of the wick is disposed within the reservoir, wherein the wick is configured to draw vaporizable liquid in contact with the second end of the wick to the first end of the wick;

an ultrasonic transducer disposed between the inlet and outlet of the vapor chamber, wherein the ultrasonic transducer is configured to oscillate at a frequency sufficient to vaporize, via cavitation, the vaporizable liquid drawn to the first end of the wick;

a power supply housing secured to the container;

a self-contained power supply operably connected to the ultrasonic transducer, wherein the self-contained power supply is housed within the power supply housing;

a controller housing secured to the container; and a controller configured to regulate oscillation of the ultrasonic transducer operably connected to the ultrasonic transducer, wherein the controller is housed within the controller housing.

11. The device of claim 10, further comprising a receiver operably connected to the controller, wherein the receiver is configured to receive signals from a radio frequency remote, and wherein the controller is configured to regulate oscillation of the transducer based on the signals transmitted from the radio frequency remote.

12. The device of claim 11, wherein the receiver is housed within the power supply housing.

13. The device of claim 10, further comprising a waterproof power switch, wherein the power switch is secured to the power supply housing and is configured to control the delivery of power from the self-contained power supply to the transducer.

14. The device of claim 10, further comprising a level sensor operably connected to the controller, wherein the level sensor is configured to detect the level of liquid within the reservoir, and wherein the controller is configured to stop the flow of power from the self-contained power supply to the transducer upon the level sensor detecting the liquid level within the reservoir is below a defined threshold.

15. The device of claim 10, wherein the container is comprised of a shatterproof material.

16. The device of claim 10, wherein the power supply housing and controller housing are waterproof.

17. The device of claim 10, wherein the power supply housing and controller housing are comprised of a shatterproof material.

18. A method for vaporizing liquid game attractant, said method comprising the steps of:

providing a vaporizing device comprising:

a container comprising:

a first half defining a vapor chamber and a protective sheath, wherein the vapor chamber has an inlet and an outlet, a second half defining a reservoir for holding a vaporizable liquid therein, wherein the first half and the second half are removably secured together and the protective sheath substantially covers the second half;

a wick disposed within the container such that a first end of the wick is disposed within the vapor chamber and a second end of the wick is disposed within the reservoir, wherein the wick is configured to draw vaporizable liquid in contact with the second end of the wick to the first end of the wick;

a transducer configured to oscillate at a frequency sufficient to vaporize, via cavitation, the vaporizable liquid drawn to the first end of the wick,
  wherein the transducer is disposed between the inlet and the outlet of the vapor chamber;
a self-contained power supply operably connected to the transducer; and
a controller configured to regulate oscillation of the transducer operably connected to the transducer;
loading a vaporizable liquid into the reservoir such that the second end of the wick is at least partially submerged by the vaporizable liquid, whereby
vaporizable liquid from the second end of the wick is drawn to the first end of the wick,
  wherein the vaporizable liquid is at least partially comprised of liquid game attractant; and
engaging the transducer such that the vaporizable liquid drawn to the first end of the wick is vaporized.

19. The method of claim 18, wherein the vaporizing device further comprises:
a receiver operably connected to the controller,
  wherein the receiver is configured to receive remote signals transmitted from a transmitter, and
wherein the step of engaging the transducer comprises:
  transmitting a power signal from the transmitter to the receiver.

20. The method of claim 18, further comprising the step of:
varying the oscillation frequency of the transducer via the controller.

* * * * *